(12) United States Patent
Garavaglia

(10) Patent No.: US 7,762,299 B2
(45) Date of Patent: Jul. 27, 2010

(54) SELF-SUPPORTING TIRE FOR WHEELS FOR BICYCLES, MOTOR-CYCLES AND THE LIKE

(76) Inventor: Pietro Garavaglia, Via Primo Mazzolari, 48, Milano (IT) I-20142

( * ) Notice: Subject to any disclaimer, the term of this patent is extended or adjusted under 35 U.S.C. 154(b) by 374 days.

(21) Appl. No.: 11/543,643

(22) Filed: Oct. 5, 2006

(65) Prior Publication Data

US 2007/0079916 A1 Apr. 12, 2007

(30) Foreign Application Priority Data

Oct. 7, 2005 (EP) .................................. 05425704

(51) Int. Cl.
*B60C 7/00* (2006.01)
*B60C 7/10* (2006.01)
(52) U.S. Cl. ........................ 152/450; 152/155; 152/157; 152/158; 152/196; 152/246; 152/310
(58) Field of Classification Search ................. 152/204, 152/450, 246, 310
See application file for complete search history.

(56) References Cited

U.S. PATENT DOCUMENTS

| | | | |
|---|---|---|---|
| 3,987,832 A | * | 10/1976 | Funke ......................... 152/310 |
| 4,371,023 A | * | 2/1983 | Campagna ................... 152/158 |
| 4,734,232 A | * | 3/1988 | Hoesman ..................... 264/46.6 |
| 5,439,041 A | * | 8/1995 | Siegenthaler ................ 152/541 |
| 5,906,836 A | | 5/1999 | Panaroni et al. |
| 6,729,373 B2 | * | 5/2004 | Yukawa et al. ............... 152/450 |

FOREIGN PATENT DOCUMENTS

| | | |
|---|---|---|
| FR | 2 607 448 B1 | 6/1988 |
| GB | 1 524 472 B1 | 9/1978 |
| GB | 2 047 637 B1 | 12/1980 |
| JP | 2004-82822 | * 3/2004 |

OTHER PUBLICATIONS

Machine translation of JP 2004-82822, 2004.*

* cited by examiner

*Primary Examiner*—Justin Fischer
(74) *Attorney, Agent, or Firm*—R. Ruschena Patent Agent, LLC

(57) ABSTRACT

Disclosed is a self-supporting tire for wheels for bicycles, motorcycles and the like comprising an outer surface layer (5), which establishes contact with the ground (8) and an inner supporting layer (6) realized by a flexible polyurethane elastomer with a cellular structure, which at least partially occupies the internal volume of the tire (1) and supports the outer surface layer, also comprising a flexible membrane (9) substantially having the shape of the outer layer (5) and radially compressing the inner supporting layer (6).

7 Claims, 2 Drawing Sheets

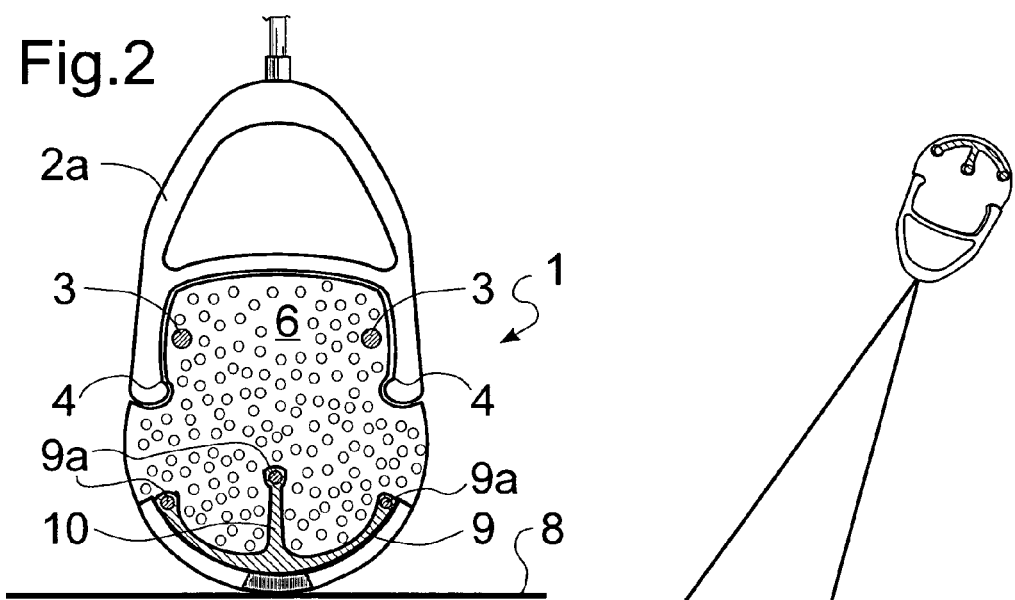
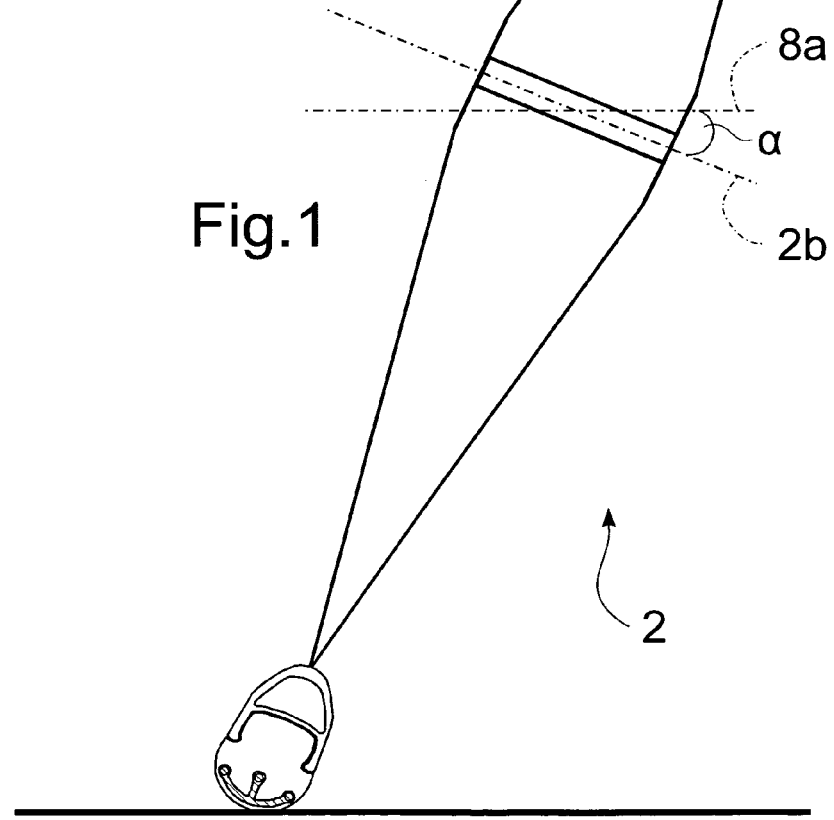

SELF-SUPPORTING TIRE FOR WHEELS FOR BICYCLES, MOTOR-CYCLES AND THE LIKE

FIELD OF THE INVENTION

The present invention relates to a self-supporting tire for wheels for bicycles, motorcycles and the like of the type comprising an outer layer, suitable to establish contact with the ground, an inner supporting layer, composed of polymer material and suitable to support said outer surface layer.

DESCRIPTION OF THE PRIOR ART

As it is known, tires, or pneumatic tires, cover the peripheral area of the wheels for vehicles of all types.

Tires are therefore the point of contact between vehicle and asphalt road surface, said contact occurring precisely through an outer surface area called tread.

The purpose of tires is: to maintain contact between the vehicle and the ground, to transmit the forces imparted on the vehicle to the ground, to cushion any impacts with the surface and to roll along the ground with low energy loss.

Therefore, tires must have: high static friction, useful to maintain high traction, low rolling friction to avoid dissipating a large quantity of energy and high elasticity, useful to cushion the vehicle to which they are fitted.

The most well-known and widely used tires are pneumatic tires.

These are substantially composed of a tubular elastic covering in natural or synthetic rubber inflated with pressurized air.

Said pneumatic tires exploit the elasticity of the air contained therein and have considerable advantages of increased rolling performance, immediate spring back, high cushioning of impacts, rigidity, grip and yet others.

As it is known, pneumatic tires are nonetheless subject to punctures, bursting or deflations that make them permanently or temporarily unusable and which can be unexpected and dangerous for the person driving the vehicle on which they are used.

To solve the drawback mentioned, solid or self-supporting tires, composed of elastic materials, preferably of natural rubbers, synthetic rubbers or elastomers, can be used. This type of tire attempts to reproduce the characteristics of pneumatic tires and does not require the presence of pressurised gas to support it.

Nonetheless, solid or self-supporting tires have inferior characteristics compared to pneumatic tires. In fact, they have inferior rolling performance and spring back compared to the pneumatic tires commonly used.

Moreover, some self-supporting tires are subject to phenomena of bounce and vibrations unacceptable for vehicles such as bicycles and motorcycles.

Due to the drawbacks mentioned, self-supporting tires are currently used almost exclusively on prams, trolleys and similar vehicles.

To improve the characteristics of self-supporting tires numerous modifications and improvements have been made to the materials and structures thereof.

Some improvements have been obtained through appropriate selection of and different ways of producing the materials used to fill the tire; in particular, considerable improvements have been attained with the use of closed cell foamed microcellular polyurethane, as illustrated in the patent IT 1176358 by the same applicant.

Said material already offers improved rolling performance of the self-supporting wheel and causes a reduction in phenomena of bounce together with a reduction in weight.

Also known, in self-supporting tires for cars, is the use of a flat rigid band, embedded in the tire, which encircles the whole wheel in proximity to the outer surface of the tire.

This rigid band ensures that all local deformation of the tire tends to involve the whole tire through load distribution, similar to the case of pneumatic wheels, in which local deformation involves all the gas contained in the pneumatic tire and consequently the whole tire.

A solution of this type is indicated in the patent U.S. Pat. No. 6,142,203.

Nonetheless, a band of this type cannot be used in tires for bicycles and mopeds due to the large diameter and small section, which would require an excessively rigid ring to involve the whole tire, to the detriment of mass and of cushioning.

Moreover, in wheels for cars and the like, the axis of rotation remains in a position always substantially parallel to the ground. Therefore, these tires always come into contact with the ground along a single cylindrical ring.

Essentially, tires for motor vehicles have, in any plane of section passing through the axis of rotation, a substantially flat tread.

Instead, the axis of rotation of bicycle and motorcycle wheels does not always remain parallel to the ground: in fact, to oppose the centrifugal force when going round bends, two-wheeled vehicles lean towards the centre of the bend.

Therefore, bicycle and motorcycle tires come into contact with the ground through a surface which, in any plane of section passing through the axis of rotation, is substantially defined by an arc of circumference.

The use of a flat rigid encircling band as described, in a tire for wheels for bicycles and the like would therefore cause dangerous irregularity in the conformation of the tire, due to the difference in the shape of the rigid band and the surface of the tire.

Said irregularity would cause discontinuity in the reactions produced by the tire as a function of the angle of inclination of the wheel, which are most prominent particularly when going round bends and also cause cutting forces within the tire itself, which would damage it.

Although improving the physical characteristics of the self-supporting tires, the expedients and modifications described are unable to give them the exceptional qualities of pneumatic tires.

A further drawback of self-supporting tires is that the peripheral area of the wheel is heavier than in pneumatic tires, causing considerable and undesirable inertia when the rotation speed of the wheel varies.

SUMMARY OF THE INVENTION

In this situation, the technical aim underlying the present invention is to produce a self-supporting tire for wheels for bicycles, motorcycles and the like capable of substantially overcoming the aforesaid drawbacks.

Within the scope of said technical aim, an important object of the invention is to produce a self-supporting tire for wheels for bicycles, motorcycles and the like which has a rolling performance similar to pneumatic tires.

Another important object of the invention is to obtain a self-supporting tire for wheels for bicycles, motorcycles and the like which sufficiently cushions the impacts to which the vehicle is subjected in contact with the irregularities of the ground.

Another important object of the invention is to obtain a self-supporting tire for wheels for bicycles, motorcycles and the like which has a lower mass.

The technical aim and the objects specified are attained by a self-supporting tire for wheels for bicycles, motorcycles and the like comprising: an outer layer, suitable to establish contact with the ground, an inner supporting layer, composed of a flexible polyurethane elastomer with a cellular structure, at least partially occupying the internal volume of said tire and suitable to support said outer surface layer, said tire comprising a flexible membrane having substantially the shape of said outer layer and radially compressing said inner supporting layer.

Said tire has substantially the same rolling performance and comfort as pneumatic tires, without being subject to possible punctures.

BRIEF DESCRIPTION OF THE DRAWINGS

Further features and advantages of the invention are better explained below in the detailed description of a preferred embodiment of the invention, with reference to the attached drawings, wherein:

FIG. 1 shows a tire according to the invention in a plane of section passing through the axis of rotation of the wheel on which said tire is fitted;

FIG. 2 schematizes a wheel for bicycles and the like in an inclined position;

Figure 3A:
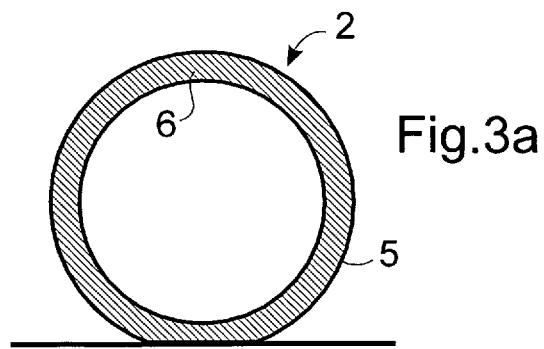
FIG. 3a schematizes operation of a conventional self-supporting tire in a plane of section perpendicular to the axis of rotation of the wheel on which said tire is fitted.

With reference to the aforesaid Figures, the tire according to the invention is indicated as a whole with number 1.

It is fitted to a rim 2a of a wheel 2 for a bicycle, motorcycle or two-wheeled vehicle in general.

DESCRIPTION OF A PREFERRED EMBODIMENTS

The tire 1 is fitted to the rim 2a according to known techniques, such as: using two strong elastic rings 3, composed of continuous semi-elastic or steel wire, which fix the upper part of the tire in specific loops 4 produced on the rim, or by bonding the tire 1 to the rim 2a, or using other techniques.

The tire 1 has an outer layer 5, suitable to establish contact with the ground and an inner supporting layer 6 composed of elastic polymer material, which at least partially occupies the internal volume of the tire 1.

The outer layer 5 can be integral with the supporting layer 6. In this case it is composed of polyurethane or the like, or of vulcanized rubber.

In the preferred embodiment, the outer layer 5 is integral with the supporting layer 6 and a median portion thereof, known as tread 7, comes into contact with the ground 8.

As it is known, the tread 7 comes into contact with the ground 8, presumed as flat, through a central portion of tread 7 when the axis 2b of the wheel 2 is parallel to the horizontal axis 8a. Instead, when the axis 2b of the wheel is inclined by an angle a other than zero with respect to the horizontal axis 8a, as occurs when going round bends, the tread 7 comes into contact with the ground 8 through a lateral portion of tread 7, as shown in FIG. 2.

The purpose of the inner supporting layer 6 is instead to support the tire 1. In pneumatic tires this support is provided by the pressurized air.

The supporting layer 6 occupies a prevalent portion of the internal volume of the tire 1.

Moreover, it is preferably composed of a flexible polyurethane elastomer with a closed cell foamed microcellular structure, with a final density of the structure ranging from 0.2 to 0.5 $kg/dm^3$.

A material of this type is, for instance, produced by the Italian firm Sinergit S.r.l. with the name "Reselgit microcellulare".

Said material has ideal behaviour: in fact, it optimally cushions impacts to which the tire 1 is subjected during use, said impacts being absorbed and partly dissipated by adiabatic compression of the gas contained in the microcells and partly dissipated in the form of heat.

This material consequently has considerably reduced bounce and vibrations.

Moreover, unlike the case of many polymer materials, Reselgit microcellulare rapidly dissipates absorbed heat into the environment and is very long-lasting, as said polymer material is not subject to the aging phenomena typical of many polymer materials, even after several years of use.

Due to these optimal characteristics Reselgit microcellulare can also be used to produce the outer layer 5, in particular if this is integral with the supporting layer 6, and Reselgit with a density ranging from 0.5 to 0.8 $kg/dm^3$ is preferably used.

Moreover, according to in-depth studies by the applicant, the rolling performance of the wheel is due mainly to two factors: reactivity of the tire, i.e. the speed with which the tire returns to its circular shape after it has been deformed, and the grip it has on the asphalt road surface, i.e. the surface area of tread 7 in direct contact with the ground 8.

In fact, it is known that the rolling friction which develops during rolling of the wheels is, with the same quantity of material forming the tread 7, directly proportional to the grip the tire imparts on the ground, which in turn is directly proportional to the rigidity of the tire 1.

The applicant has however found that, with the same grip, pneumatic tires have better rolling performance than self-supporting tires.

This is due to the fact that self-supporting tires have lower reactivity than pneumatic tires, due to the materials they are composed of and to the fact that, unlike the case of pneumatic wheels, the forces imparted by the asphalt road surface on the self-supporting tires only act on a limited portion of the tire.

This lower reactivity does not allow the self-supporting tires, which become deformed under the vertical thrust of the weight, to return rapidly to their circular shape after deformation. Consequently, tires with lower reactivity have a shape that is substantially less circular during rolling and, consequently, a lower rolling performance.

In order to increase the reactivity of the tire the applicant has found an improvement thereof, in the case in which the material constituting the supporting layer 6 is pre-compressed.

In particular, a very high reactivity was found with the use of Reselgit microcellulare reduced by compression in a volume percentage ranging from 10% to 20%.

It is in fact known to the applicant that this material, similar to many foamed and elastic polymer materials, has very rapid spring back when deformations are high, and much slower spring back when deformations are low. Thanks to pre-compression, the elastic body is in a working range with rapid spring back even with small deformations. The reactivity of said elastic body is therefore always high.

In order to obtain optimal characteristics of the tire 1, it has a flexible membrane 9 with high tensile strength, that is, which is substantially inextensible.

This flexible membrane 9 in a plane of section passing through the axis 2b is in contact with the supporting layer 6 and preferably bordering with the outer layer 5.

Figure 3B:
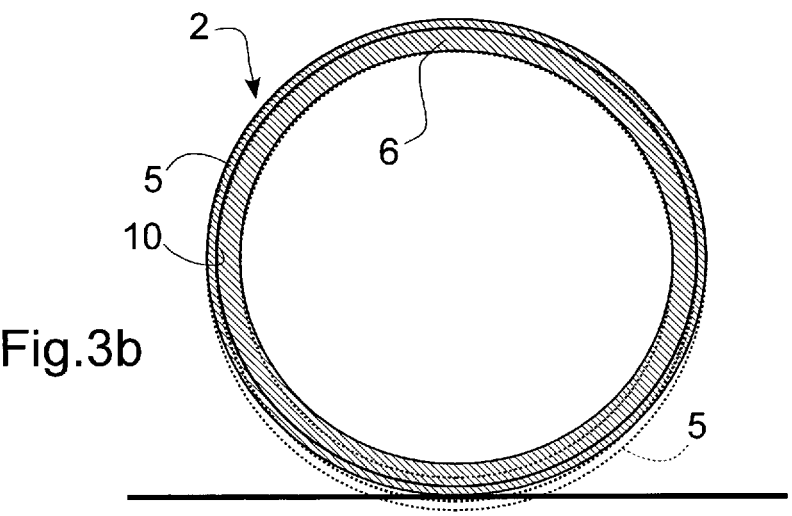
FIG. 3b schematizes operation of a self-supporting tire according to the invention in a plane of section perpendicular to the axis of rotation of the wheel on which said tire is fitted.

The flexible membrane 9 substantially follows the shape of the tread 7, in particular in a plane of section passing through the axis 2b of the wheel 2, this flexible membrane 9 has the profile of an arc of circumference of a thickness of around one millimeter, as shown in FIG. 1, while in a plane of section perpendicular to the axis 2b this membrane 9 has the shape of a ring having as its centre the centre of the wheel 2, as shown in FIG. 3b.

The flexible membrane 9 is preferably composed of a weave of threads wound on two or more ropes 9a, substantially inextensible and continuous, positioned at the two ends of the membrane 9, which encircle the whole tire 1. These threads are preferably composed of a material with high tensile strength, such as aramid fibres or the like.

Similar membranes are used to produce the body of some pneumatic tires for bicycles and motorcycles and have the advantage of having a high tensile strength in the plane of extension of the membrane, while remaining sufficiently flexible.

The membrane 9 radially compresses the inner supporting layer 6 in volume percentages ranging from 10% to 20%. Said compression is implemented simply by reducing the height of the section of the supporting layer 6 by a percentage ranging from 10% to 20% and leaving the other dimension of the section and the circumference of the wheel substantially unchanged.

Moreover, pre-compression of the supporting layer 6 determines stiffening of the tire 1 and therefore less grip on the asphalt road surface.

Grip on the asphalt road surface determined by the tire 1 can be further improved with the presence of a stiffening element 10 positioned in the centre of the tire 1, in a plane of section passing through the axis 8a.

The stiffening element 10 has a high bending strength due to the vertical load forces and, therefore, preferably extends mainly in a direction perpendicular to the ground 8.

It can have different conformations. In the preferred solution said body 10 has a triangular or trapezoidal section and is integral in one piece with the membrane 9, as shown in FIG. 1.

In this case the element 10 can be composed of the same weave of threads of which the membrane 9 is composed. Said solution proves convenient in terms of weight and distribution of forces.

Figure 4:
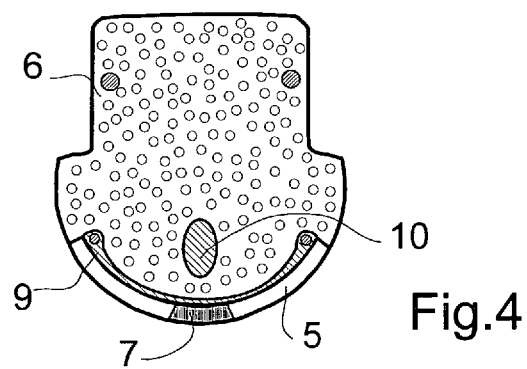
FIG. 4 shows a variant of a detail of the tire according to the invention.

Alternatively, the element 10 can be separated from said membrane 9, as shown in FIG. 4, and composed of composite fibre materials with aramid or carbon fibres with a matrix in compact polyurethane or other resins.

The presence of the stiffening body 10 considerably reduces the grip of the tire 1 on the ground 8.

Operation of the stiffening element 10 is schematized in FIG. 3a and 3b, where operation of wheels 2 with said element 10 (FIG. 3b) and wheels without said element 10 are compared schematically.

It can be noted that the stiffening element 10 involves, in the plane perpendicular to the axis 8a, a large portion of the tire 1 in local deformations. It is specified that the element 10 does not reduce elasticity and consequently cushioning of the tire 1, which can deform according to the diagram shown in FIG. 3b.

Moreover, the stiffening element 10 does not reduce the grip of the tire 1 in proximity to the non-central portions of the tread 7, i.e. the portions of tread that come into contact with the ground while going round bends. Therefore, grip of the tire 1 on the bend is not reduced.

In fact, when the tire 1 is vertically stressed by the force of gravity and is inclined by an angle a with respect to the horizontal axis 8a, the action of the element 10 is consequently more limited.

Finally, this element 10 considerable increases the load distribution on the tire 1, in the plane perpendicular to the axis 8a, due to its increased rigidity.

The invention achieves important advantages.

In fact, the tire 1 has substantially the same rolling performance and comfort as pneumatic tires, without being subject to possible punctures.

A further advantage is the low weight. In fact, the Reselgit microcellulare of which most of the tire is composed has a specific weight ranging from 0.2 to 0.8 kg/dm$^3$.

What I claim is:

1. Self-supporting tire (1) for wheels for bicycles, motorcycles and the like, said tire being without compressed air or gas inside, said self-supporting tire comprising:
    an outer layer (5), suitable to establish contact with the ground (8) which further comprises a thread portion (7);
    an inner supporting layer (6), composed of a flexible polyurethane elastomer with a cellular structure, at least partially occupying the internal volume of said tire (1) and suitable to support said outer surface layer (5) to which it is integrated;
    a flexible membrane (9), having substantially the shape of said outer layer (5) to which it is integrated, said flexible membrane (9) is made of inextensible, yet flexible material, radially compressing toward the center of the tire said inner supporting layer (6), while reducing by compression its volume by a percentage ranging from 10% to 20% even when the tire is not operational on the ground; said compression exerted by said flexible membrane (9) is substantially decreasing, at the cruising speed, the mechanical power absorbed by the tire;
    a stiffening element (10) incorporated in said supporting layer (6) and suitable to increase the rigidity of said inner supporting layer (6) to make it withstanding the bending in a plane perpendicular to the axis (2b) of the wheel (2), said stiffening element (10) being configured to reduce the contact surface of the tire (1) on the ground (8).

2. Tire according to claim 1, wherein said inner supporting layer (6) is filling up the rest of the internal volume of said tire (1).

3. Tire according to claim 1, wherein said flexible membrane (9) is composed of a weave of threads ending with ropes (9a) positioned at the two edges of the flexible membrane (9) and to the edge of said stiffening element (10).

4. Tire according to claim 1, wherein said stiffening element (10) is positioned in the center of the tire (1) on a plane perpendicular to the rotation axis (2b) of the wheel (2) and it can be integral with said flexible membrane (9) or it can be separated from said flexible membrane (9).

5. Tire according to claim 1, wherein said stiffening element (10) has a section of a substantially triangular shape and it does not reduce the elasticity of said tire (1) nor the grip of the tire (1) in proximity of the non-central portion of the tire (1), and considerably increases the load distribution on the tire (1) while reducing the contact surface of the tire on the ground surface (8).

6. Tire according to claim 1, wherein said stiffening element (10) is always extending mainly perpendicularly to the ground (8).

7. Tire according to claim 1, wherein said inner supporting layer (6), is made of "reselgit microcellular", which is a flexible polyurethane elastomer with a closed-cell foamed microcellular structure having a final density from 0.2 to 0.5 kg/dm$^3$; said "reselgit microcellular" is designed to absorb impacts by adiabatic compression of the gas contained in the microcells and by heat dissipation.

\* \* \* \* \*